No. 858,780. PATENTED JULY 2, 1907.
F. M. BECKET.
ELECTRIC FURNACE PROCESS OF MAKING LOW CARBON METALS OR ALLOYS
APPLICATION FILED JAN. 30, 1906.

Witnesses:

Inventor:
Frederick M. Becket,
by Byrnes & Townsend
Attys.

UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

ELECTRIC-FURNACE PROCESS OF MAKING LOW-CARBON METALS OR ALLOYS.

No. 858,780.     Specification of Letters Patent.     Patented July 2, 1907.

Application filed January 30, 1906. Serial No. 298,623.

*To all whom it may concern:*

Be it known that I, FREDERICK M. BECKET, a subject of the King of Great Britain, residing at Niagara Falls, in the county of Niagara and State of New York, have invented certain new and useful Improvements in Electric-Furnace Processes of Making Low-Carbon Metals or Alloys, of which the following is a specification.

There are many metals and alloys of industrial importance which can only be successfully produced in the electric furnace, owing to the high temperature required for their reduction and complete fusion; and the control of the carbon content of these metals presents one of the most difficult problems in the art of electro-metallurgy. Tungsten, titanium, molybdenum, chromium, vanadium, and their alloys, are some of the metals of this class, the chief applications of which products require that they contain a very low percentage of carbon.

For the production of well-fused metals or alloys of low-carbon content in the electric furnace, relatively expensive, non-carbonaceous reducing agents, such as aluminium or silicon, are usually employed. The reduced metals nevertheless contain an undesirable proportion of carbon, derived from the carbon electrodes. The extent to which this contamination by carbon takes place is dependent chiefly on the amount of surface of electrode carbon exposed to the action of the molten charge, and is frequently sufficient to prohibit the commercial use of the metal.

This invention has for its object an improvement in the method of manufacturing low-carbon metals in electric furnaces in which the current is conducted to and from the charge by carbon or graphite electrodes.

The process contemplates the use of electrodes of very small sectional area, in proportion to the current which they carry, as compared to those generally employed. The sectional area of electrodes must be so proportioned as to prevent their being unduly heated by the electric current which they carry, the carbon being rapidly attacked and oxidized by the furnace gases and atmospheric oxygen when raised to a high temperature.

To enable the electrodes to carry currents of the high density requisite for my process, I both cool the electrodes throughout a considerable portion of their length and protect them from the superficial action of gases.

Figure 1:
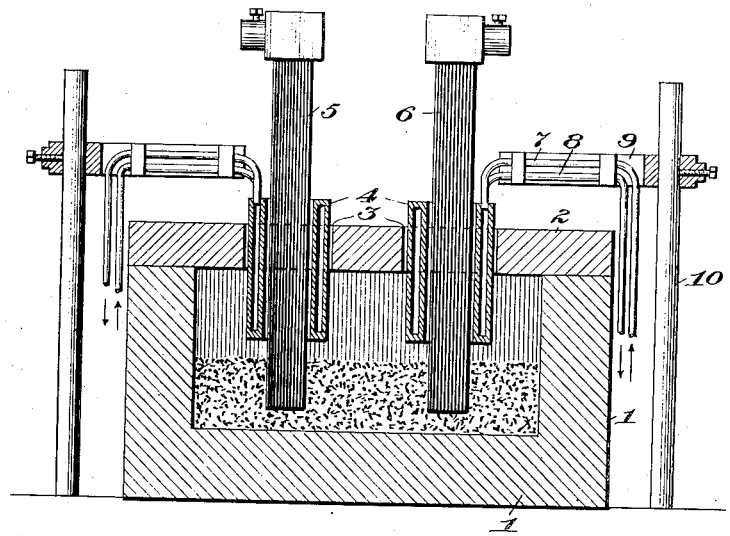
Figure 2:
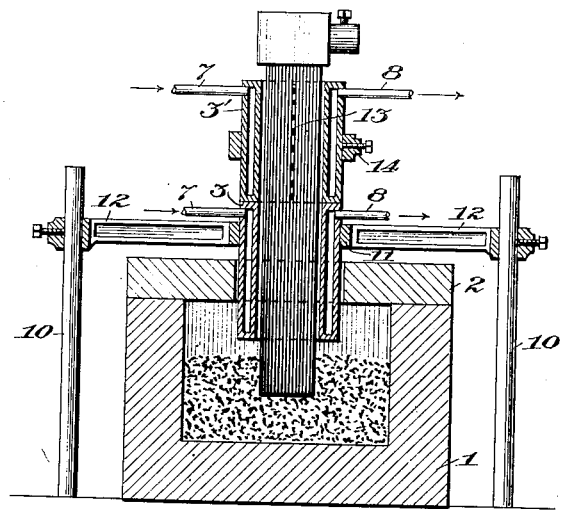

Suitable apparatus for carrying out the process is shown in the accompanying drawing, in which Figure 1 is a vertical longitudinal section of a smelting furnace, showing two depending electrodes and their cooling jackets; and Fig. 2 is a vertical transverse section of a furnace showing an electrode provided with two superposed cooling jackets.

The furnace shown comprises a floor and sides 1 and a roof 2 of fire-brick. In the roof are two vertical openings 3 through which pass the cooling jackets 4, preferably of iron, which in turn receive the electrodes 5, 6 of opposite polarity. To the upper end of each jacket are connected pipes 7, 8, carried by a bracket 9 which is adjustably mounted on a vertical rod 10. The pipes 7, 8 serve both as a means for adjustably supporting the jackets 4 independently of the furnace-roof and electrodes and for the supply and discharge of water or other cooling medium.

Fig. 2 shows a modified construction in which the electrode is provided with two superposed cooling jackets 3, 3′. The lower jacket is clamped within a ring 11 which is carried by arms 12 adjustably supported at their outer ends upon vertical rods 10. The upper jacket is preferably split longitudinally on the line 13 and the two sections are clamped together by the ring 14.

When the electrodes are short or the charge may be smelted at a comparatively low temperature, a single cooling jacket upon each electrode is sufficient; with long electrodes or in the case of operations requiring high temperatures, two or more jackets are preferably employed. It is desirable that the jackets should fit closely upon the electrodes, to facilitate the cooling, but that they should be freely adjustable upon the electrodes and within the furnace. By thus effectively cooling all or a substantial part of the electrodes, irrespective of the variations in their length, it is possible to employ unusually high current densities, especially with graphite electrodes, which are preferably employed on account of their high electrical conductivity. The surface of carbon exposed to the action of the molten charge is thus greatly reduced and it is possible to produce metals or alloys, for example thoroughly fused tungsten, chromium, ferro-vanadium and ferro-titanium, of considerably lower carbon content than by the present methods.

For the production of ferro-alloys, the charge may consist of an ore of the metal to be reduced, carbon and a source of iron, either iron ore or pieces of metallic iron.

I claim:—

1. The process of producing low-carbon metals or alloys, which consists in smelting the charge by an electric current of high density, carried by a carbon electrode of relatively small sectional area, and cooling said electrode throughout a considerable portion of its length, as set forth.

2. The process of producing low-carbon metals or alloys, which consists in smelting the charge by an electric current of high density, carried by a carbon electrode of relatively small sectional area, and cooling said electrode and protecting it from oxidation throughout a considerable portion of its length, as set forth.

3. The process of producing low-carbon ferro-alloys, which consists in smelting a charge of ore, a reducing agent and a source of iron, by an electric current of high density, carried by a carbon electrode of relatively small sectional area, and cooling said electrode throughout a considerable portion of its length, as set forth.

4. The process of producing low-carbon ferro-alloys, which consists in smelting a charge of ore, a reducing agent and a source of iron, by an electric current of high density, carried by a carbon electrode of relatively small sectional area, and cooling said electrode and protecting it from oxidation throughout a considerable portion of its length, as set forth.

In testimony whereof, I affix my signature in presence of two witnesses.

FREDERICK M. BECKET.

Witnesses:
CHAS. M. SAXAR,
R. L. MACDONALD.